United States Patent Office 3,692,538
Patented Sept. 19, 1972

3,692,538
METHOD OF PREPARING MEATY-FLAVORED PROTEIN HYDROLYZATES FROM MEAT CARCASS COMPONENTS
Valentin G. Moss, Monona, and Jack C. Trautman, Madison, Wis., assignors to Oscar Mayer & Co. Inc., Madison, Wis.
No Drawing. Filed July 14, 1970, Ser. No. 54,860
Int. Cl. A22c *18/00;* A23k *1/10*
U.S. Cl. 99—107                          23 Claims

ABSTRACT OF THE DISCLOSURE

Subdivided meat carcass components (e.g., bones and offal) are mixed with water and heat and/or enzyme hydrolyzed so as to solubilize a substantial portion of the protein content. A clear and essentially fat-free aqueous solution of protein-hydrolyzate is separated and treated with a relatively high concentration of acid (preferably hydrochloric acid) under refluxing conditions for a sufficient time to develop a meaty or brothy flavor while concurrently eliminating offalish and bitter flavor.

---

This invention relates generally to innovations and improvements in preparing meaty- or brothy-flavored protein hydrolyzates, which are further characterized in being substantially free from offalish and bitter flavors, from ground or subdivided meat carcass components which, generally, will be in the nature of inexpensive by-products or waste materials such as the trimmed bones and offal associated with a meat packing plant operation. The resulting meaty-flavored protein hydrolyzates may or may not be edible, depending upon whether or not the starting materials are edible or inedible and applicable governmental regulations.

More particularly, the invention relates to preparing meaty- or brothy-flavored protein hydrolyzates of the class described wherein subdivided meat carcass components are first subjected to heat and/or enzyme hydrolysis so as to solubilize a substantial portion of the protein content thereof and the resulting solution of protein hydrolyzate is separated in a clear and essentially fat-free condition. Thereafter, the clear and essentially fat-free aqueous protein hydrolyzate solution is subjected to acid-hydrolysis by refluxing with a relatively high amount of acid, preferably at an elevated temperature.

The object of the invention, generally stated, is the provision of a practical and economical method of preparing meaty- or brothy-flavored protein hydrolyzates, which may be used for various human and animal nutrition purposes, from inexpensive and by-product meat carcass components such as bones and offal, such hydrolyzates being essentially free of offalish and bitter flavors.

An important object of the invention is the provision of a new and improved method of preparing meaty- or brothy-flavored protein hydrolyzates of the character described from inexpensive meat carcass components and by-products in an efficient manner at economical cost whereby substantial portions of the protein content of such low grade meat carcass components and by-products are up-graded for various food uses in the field of human and animal nutrition.

Certain other and more specific objects of the invention will in part be obvious and will in part appear hereinafter.

For a more complete understanding of the nature and scope of the invention, reference may now be had to the following detailed description thereof wherein illustrative working examples are set forth and practical and permissible variations therein are stated.

The present invention makes excellent use of inexpensive by-products or waste material from packing house operations, notably, bones having residual pieces of meat thereon, and so-called offal which includes animal carcass components, glands, organs, feet, etc. The meaty-flavored protein hydrolyzates recovered from such materials in accordance with the present invention may be suited for human and/or animal consumption, depending upon whether or not the meat carcass components used in the process are of edible or inedible quality and applicable governmental regulations. At the present time products for human consumption have to be of edible quality and must be processed like edible materials. It is evident that the invention is also suitable to produce a product for animal nutrition using starting material of inedible quality.

As a practical matter, whatever meat carcass components are utilized will be ground or subdivided to facilitate the process and the yield. Thus, when bones are used they will generally be broken or ground so that the individual pieces range in size from about ¼″ to about 2″. When ground offal is used, these materials may be ground or subdivided by passing through a pre-breaker.

It is understood that while inexpensive by-products of the nature of bones and offal will normally be used as the basic raw material in the process of the present invention, there is no reason why higher grades of meat carcass components cannot be used when the economics or conditions justify such use. However, for the present, the invention will have its greatest use with the inexpensive by-products mentioned wherein the protein content is roughly worth about 2¢ per pound in the raw state whereas, the meaty-flavored protein hydrolyzates obtainable therefrom by the process are worth approximately 35¢ to 45¢ per pound.

The subdivided meat carcass components, whatever their kind or nature, are first mixed with water and subjected to hydrolysis by heat alone, by enzyme alone, but preferably by the combined action of heat and enzyme action. As a practical matter, the minimum amount of added water will equal about 50% by weight of the meat carcass components and may range up to as much as 2.5 times or 250% of the weight thereof. Generally, it is preferred to use about two parts by weight of water to one part by weight of the meat carcass components.

Various proteolytic enzymes may be used in the process but, from several standpoints, a presently preferred enzyme is papain. This enzyme is economical in cost, has good potency, is readily available commercially, is easy to handle and work with, and provides good operating conditions. Other enzymes that have been used with practical success include pancreatin and ficin. The minimum useful amount or concentration of enzyme will be about 0.05% by weight of the protein content of the meat carcass components, but usually a minimum of about 0.1% by weight will be used, and preferably about 0.2% will be used.

Usually, the subdivided meat carcass components will have a substantial fat content and it is generally desirable to initially heat the aqueous mixture thereof to a temperature in the range of from about 195° F. to about 270° F. for from about one-half hour to about three hours. At the end of this preliminary heat treatment most of the fat content can be readily separated from the aqueous mixture such as by allowing the fat to form a top layer which may be readily skimmed off.

The action of enzyme on the protein content of the meat carcass components is generally proportional to the time and temperature of the treatment. Thus, while papain will hydrolyze meat protein within a temperature range of from about 32° to about 176° F. and the time may be as short as about an hour at the highest temperature and take as long as 72 hours at the lowest, it is preferable to operate at an intermediate temperature and time, e.g., 158° F. for approximately 40 hours.

Normally the enzyme will be inactivated at the completion of the first hydrolysis by raising the temperature of the mass to a value whereat the enzyme is inactivated in a short time, e.g., 212° F. for about 10–20 minutes in thec ase of papain. The enzyme inactivation may come either before or after the liquid product phase of the batch is separated from the solid phase, and before or after residual fat and suspended solids in the liquid product phase have been removed or separated such as by centrifuging.

The clear and essentially fat-free protein hydrolyzate obtained from the first part of the method or process wherein a substantial portion of the protein content of the meat carcass components are heat and/or enzyme hydrolyzed is further hydrolyzed with acid in the second portion of the process or method, which further treatment has a two-fold effect. It develops a meaty or brothy flavor in the protein hydrolyzate and at the same time it eliminates the offalish and bitter flavors normally associated with such protein hydrolyzates. Sometimes the off-flavor of the enzyme hydrolyzate from the first portion of the process is suggestive of the odor of wet feathers.

In the flavor-improving and developing acid hydrolysis portion of the method or process there are two important parameters. One is the amount of acid used and the other is the protein concentration in the hydrolyzate. The protein concentration may range from about 24% to about 60% by weight with 50% being preferred. For several reasons, hydrochloric acid is the acid of choice to use in the flavor-improving and developing second portion of the method or process. It has been ascertained that the amount of hydrochloric acid used, expressed in terms of HCl gas, is in the range of from about 24% to about 50% by weight of the protein content of the clear and essentially fat-free protein hydrolyzate solution, with 36% by weight being preferred. Other acids may be used including phosphoric, sulphuric, and acetic, in amounts which are stoichiometrically equivalent to the useful range of hydrochloric acid.

One of the primary advantages of using hydrochloric acid is that at the end of the process or method the pH may be increased by addition of sodium hydroxide and the resulting NaCl formed will usually not be objectionable in the finished product. On the other hand, the phosphate and sulphate salts tend to be bitter tasting and may require removal from the final product.

In addition to neutralizing excess acid in the protein hydrolyzate at the end of the method or process of the present invention, it is also usually desirable to dilute the solution and add a small amount of active carbon, followed by heating and filtration so as to enhance precipitation of humins. Usually the final filtered solution will be concentrated under vacuum.

The following example illustrates the processing of bones by the method of the present invention so as to produce therefrom a protein hydrolyzate characterized by a desirable meaty and brothy flavor and which is essentially free from offalish and bitter flavors.

EXAMPLE 1

Three thousand pounds of pre-broken, edible beef bones approximately 1½" large were placed in a hydrolyzing tank, and 6,000 lbs. of water were added. The mixture was heated by introduction of live steam to a temperature of 212° F. in approximately one hour. The fat layer that formed on the top of the mass was skimmed off and the batch was cooled with the addition of ice to 158° F.

It was estimated that the bones had a protein content of about 20% by weight and 1.2 lbs. of papain were made into a thick aqueous slurry and added to the batch. While maintaining the temperature of the batch at about 158° F., the enzyme-heat hydrolysis was allowed to carry on for 40 hours with vigorous mixing action.

At the end of the 40 hours the hydrolysis was terminated by heating the batch to 212° F. with live steam injection for about 15 minutes. Thereafter, the hydrolyzate or liquid phase was drawn off from the bones and centrifuged to eliminate residual fat and suspended solids therefrom. The resulting clear and essentially fat-free protein hydrolyzate was in condition to be concentrated to a protein content of about 50%, after which it could be treated with acid in the second phase or portion of the process or method.

Four hundred pounds of a 50% concentrate of the clear, essentially fat-free protein hydrolyzate obtained in the first part of the process was refluxed with 257 lbs. of 18° Baumé hydrochloric acid for 16 hours with external heating. The acid hydrolysis was terminated by cooling the batch externally and by addition of ice, to 50°–55° F. The pH of the solution was raised by adding sodium hydroxide solution under constant mixing. When the pH value of 6.2–6.3 was reached, the solution was diluted to double its volume. Five percent of the assumed amount of protein in the solution was added in active carbon and the solution heated to 140°–160° F. After about 20 minutes, the solution was filtered and concentrated in vacuum.

The following parameters or ranges were found to apply to the second phase or acid hydrolysis portion of the process or method:

(1) Refluxing may last from one to 24 hours but approximately 16 hours is preferred. Optimal flavor development is achieved when the amino nitrogen content equals about 60%–62% of the total soluble nitrogen.

(2) The protein concentration in the starting concentrate may vary between 24% and 60% and is preferably 50%.

(3) The amount of HCl gas introduced in hydrochloric acid form may vary between 24% and 50% by weight of the protein but is preferably 36%.

(4) The pH value of the process solution may vary, according to need. A pH value in the range of from 6.0 to 6.5 was found most desirable.

(5) The use of active carbon is optional and may be added to the acidic mixture prior to heating or prior to neutralizing of the acid with sodium hydroxide. It may also be mixed in after pH adjustment but prior to dilution.

(6) The strength or concentration of the hydrochloric acid may range from 15 to 23° Baumé, preferably 18° Baumé.

(7) Dilution and subsequent heating was found to enhance precipitation of humins. Dilution to about twice the original volume lowers the protein content to about 10%–15%, and provides good humins precipitation.

The protein hydrolyzate obtained from Example 1 may be used for a variety of edible purposes, including the following, for example: gravies, sauces, soups, and meat flavored crackers, dips and pastes.

EXAMPLE 2

One thousand parts by weight of offal was blended with five hundred parts by weight of water and the mixture heated to approximately 210° F. for one hour. It was then centrifuged at $900 \times g$ for ten minutes. Fat was decanted from the liquid phase that was separated and the aqueous and solid phases were then cooled to 120° F. and the pH adjusted to 5.0. Then 0.2% ficin was added and the batch was held at 120° F. for twenty hours. Insolubles were then removed by centrifuging at $900 \times g$ for ten minutes and the liquid phase was filtered, giving an essentially fat-free protein hydrolyzate solution characterized by having an offalish and bitter flavor. This aqueous solution can be subjected to acid hydrolysis for flavor improvement in accordance with the procedure as set forth above in Example 1.

In carrying out the heat-enzyme hydrolysis in Example 2, the following changes may be made:

(1) The ratio of added water may range from 50% to 250%.

(2) The heating may range from 175° F. to 280° F. for from 0.1 to 240 minutes.

(3) The pH of the batch may range from 2.0 to 8.0.

(4) The enzyme may be any proteolytic enzyme added in an amount equal to from about 0.05% to 5% by weight of the protein content.

(5) The enzyme hydrolysis temperature may range from 60° F. to 180° F.

EXAMPLE 3

Three thousand pounds pre-broken, edible beef bones between ¼" to 2" in size were placed into a hydrolyzing tank and 3000 lbs. of water were added. Live steam was introduced to heat the mixture to 212° F. for one hour. The formed fat layer was skimmed off and with addition of ice the temperature was lowered to 104° F.

Assuming a 20% protein content in the bones, 1.2 pounds of pancreatin powder are dissolved in a small amount of liquid and added to the slurry. Also 100 lbs. dichloroethylene, B.P. 53° C., are added as a bacteriostat. The tank is closed and hydrolysis continued under mixing for 24 hours.

The hydrolysis was terminated by heating the slurry to 212° F. for 10 minutes with live steam, drawing off the liquid from which suspended matter and fat was eliminated by centrifuging and filtration.

The clear liquid with a protein content of about 5–10%, had a bland to brothy taste and is suitable for use as a protein basis in other food preparations, or may be treated with hydrochloric acid to obtain a roast beef flavored hydrolyzate.

In carrying out Example 3 the following changes may be made:

(1) The ratio of added water may range from 50 to 250%.

(2) The heating may range from 175° F. to 280° F. from ½ to 3 hours.

(3) The pH of the batch may range from 6.0 to 9.0.

(4) The amount of enzyme added may be equal to from about 0.05% to 5% by weight of the protein content.

(5) The enzyme hydrolysis temperature may range from 45° F. to 158° F.

What is claimed as new is:

1. The method of preparing meaty-flavored protein hydrolyzates which are at least substantially free from offalish and bitter flavors, which comprises, subjecting an aqueous mixture of subdivided meat carcass components to heat and/or enzyme hydrolysis so as to solubilize a substantial portion of the protein content thereof, separating a clear and essentially fat-free aqueous solution of protein hydrolyzate from said mixture, admixing with said aqueous solution of protein hydrolyzate at a protein hydrolyzate content in the range of from about 24% to about 60% by weight of protein hydrolyzate acid in an amount stoichiometrically equivalent to that amount of hydrochloric acid which in terms of HCl gas is in the range of from about 24% to about 50% by weight of said protein content of said aqueous protein hydrolyzate solution, and refluxing the acidified aqueous protein hydrolyzate solution for from about 1 to about 24 hours.

2. The method of claim 1 wherein said subdivided meat carcass components are bones with at least residual pieces of meat thereon.

3. The method of claim 1 wherein said subdivided meat carcass components are offals.

4. The method of claim 1 wherein said aqueous mixture of subdived meat carcass components is subjected to enzyme hydrolysis to solubilize at least a substantial portion of the protein content thereof and said enzyme hydrolysis is terminated by heating said mixture to enzyme-inactivating temperature.

5. The method of claim 2 wherein said bones have a particle size in the range of from about ¼" to about 2", water is added to said ground bones in an amount equal to from about 50% to about 250% by weight thereof, said aqueous mixture of bones is initially heated to a temperature in the range of from about 195° F. to about 270° F. for from about ½ hour to about 3 hours, fat is separated from said heated aqueous mixture, said aqueous mixture is cooled to at least about 158° F., papain is added to said aqueous mixture in an amount at least equal to about 0.05% by weight of the protein content thereof, said aqueous mixture is hydrolyzed in the presence of papain at a temperature of from about 32° F. to about 176° F. for from about 1 to about 72 hours, said aqueous mixture is heated to inactivate said papain, the liquid product phase of said aqueous mixture is separated from the solids phase, and said separated liquid product phase is centrifuged to remove residual fat and suspended solids therefrom.

6. The method of claim 5 wherein approximately 200% by weight of water is added based on the weight of the bones, said aqueous mixture of bones is initially heated to a temperature of about 212° F. in approximately one hour, approximately 0.2% papain is added based on the weight of the protein content of said aqueous mixture, and said aqueous mixture is hydrolyzed in the presence of papain at a temperature of approximately 158° F. for approximately 40 hours.

7. The method of claim 5 wherein heating to inactivate said papain is carried out after said removal of said residual fat from said liquid product phase.

8. The method of claim 5 wherein the pH of said liquid product phase from which residual fat and suspended solids have been removed is adjusted to approximately 5.

9. The method of claim 1 wherein said acid admixed with said aqueous solution of protein hydrolyzates is hydrochloric acid of from about 15° to about 23° Baumé.

10. The method of claim 1 wherein said refluxed solution is treated by means of heat and active carbon to remove humins therefrom.

11. The method of claim 2 wherein approximately 18° Baumé hydrochloric acid is admixed with said aqueous solution of protein hydrolyzates having a protein concentration of about 50% by weight in an amount such that its HCl gas content equals approximately 36% by weight of the protein content, and said admixture is refluxed for approximately 16 hours.

12. The method of claim 11 wherein after refluxing for approximately 16 hours the batch is cooled to from about 50° to about 55° F. sodium hydroxide is added with agitation to raise the pH to about 6.2 to 6.3, the batch is diluted with water to approximately twice its volume, the solution is heated to about 140° to 160° F. and thereafter the solution is clarified and concentrated.

13. The method of claim 12 wherein active carbon is added to said solution in an amount equal to approximately 5% by weight of the protein content in solution, said addition being made by any time prior to said dilution thereof.

14. The method of claim 3 wherein water is added to said subdivided offals in an amount equal to from about 50% to about 250% by weight thereof, said aqueous mixture of offals is initially heated to a temperature in the range of from about 175° F. to about 280° F. in from 0.1 to 240 minutes, fat is separated from said heated aqueous mixture, said aqueous mixture is cooled as required to a temperature of about 120° F. and the pH thereof adjusted as required to about 2 to 8, proteolytic enzyme is added to said aqueous mixture in an amount of from about 0.05% to about 5% by weight of the protein content, and said aqueous mixture is hydrolyzed in the presence of said enzyme at a temperature of from about 60° F. to about 180° F.

15. The method of preparing an aqueous hydrolyzate solution from ground animal carcass bones having at least residual pieces of meat thereon and a particle size in the range of from about ¼" to about 2", comprising, adding water to said ground bones in an amount aqual to from about 50% to about 250% by weight thereof, heating said aqueous mixture to from about 195° F. to about 270° F. for from about ½ hour to about 3 hours, separating fat from said aqueous mixture, cooling said aqueous mixture to at least about 158° F., adding papain to said aqueous mixture in an amount at least equal to about 0.05% by weight of the protein content thereof, holding said mixture at a temperature in the range of from about 32° F. to about 176° F. for from about 1 to 72 hours, heating said aqueous mixture to inactivate said papain, separating the liquid phase of said mixture from the solids phase thereof and centrifuging said separated liquid phase to remove residual fat and suspended solids therefrom.

16. The method of claim 15 wherein heating to inactivate said papain is carried out after said residual fat is removed therefrom.

17. The method of claim 2 wherein said bones have a particle size in the range of from about ¼" to about 2", water is added to said ground bones in an amount equal to from about 50% to about 250% by weight thereof, said aqueous mixture of bones is initially heated to a temperature in the range of from about 195° F. to about 270° F. for from about ½ hour to about 3 hours, fat is separated from said heated aqueous mixture, said aqueous mixture is cooled to at least about 158° F., pancreatin is added to said mixture in an amount at least equal to about 0.05% by weight of the protein content thereof, said aqueous mixture is hydrolyzed in the presence of pancreatin at a temperature of from about 45° F. to about 158° F. for from 1 to about 72 hours, said aqueous mixture is heated to inactivate said pancreatin, the liquid product phase of said aqueous mixture is separated from the solid phase, and said separated liquid product phase is centrifuged to remove residual fat and suspended solids therefrom.

18. The method of claim 17 wherein approximately 100% by weight of water is added based on the weight of the bones, said aqueous mixture of bones is initially heated to a temperature of about 212° F. for approximately one hour, approximately 0.2% pancreatin is added based on the protein content of said aqueous mixture, and said aqueous mixture is hydrolyzed in the presence of pancreatin at a temperature of about 104° F. for approximately 24 hours with mixing.

19. The method of claim 17 wherein heating to inactivate said pancreatin is caried out after said removal of said residual fat from said liquid product phase.

20. The method of claim 17 wherein the pH of said liquid product phase from which residual fat and suspended solids have been removed is adjusted to approximately 6.0–9.0.

21. The method of claim 17 wherein salt is incorporated into said aqueous mixture of bones prior to said initial heating step in an amount sufficient to give a salt concentration therein of from about 0.05 to about 0.3 mole per liter.

22. The method of preparing an aqueous hydrolyzate solution from ground animal carcass bones having at least residual pieces of meat therein and a particle size in the range of from about ¼" to 2", comprising, adding water to said ground bones in an amount equal to from about 50% to about 250% by weight thereof, heating said aqueous mixture to from 195° F. to about 270° F. for from about ½ hour to about 3 hours, separating fat from said aqueous mixture, cooling said aqueous mixture to at least about 158° F., adding pancreatin to said aqueous mixture in an amount at least equal to about 0.05% by weight of the protein content thereof, holding said mixture at a temperature in the range of from about 45° F. to about 158° F. for from about 1 to about 72 hours, heating said aqueous mixture to inactivate said pancreatin, separating the liquid phase of said mixture from the solids phase thereof, and centrifuging said separated liquid phase to remove residual fat and suspended solids therefrom.

23. The method of claim 22 wherein heating to inactivate said pancreatin is carried out after said residual fat is removed therefrom.

References Cited
UNITED STATES PATENTS

| | | | |
|---|---|---|---|
| 2,622,027 | 12/1952 | Torr | 99—107 |
| 3,010,829 | 11/1961 | Turner | 99—107 |
| 3,098,014 | 7/1963 | Denton et al. | 99—107 X |
| 3,580,725 | 5/1971 | Kuster | 99—7 |

HYMAN LORD, Primary Examiner

U.S. Cl. X.R.

99—7, 10, 14, 18